(12) United States Patent
Davidi et al.

(10) Patent No.: US 10,698,196 B2
(45) Date of Patent: Jun. 30, 2020

(54) LOUPE CAMERA

(71) Applicants: Guy Davidi, Ramat Gan (IL); Ofer Davidi, Ramat Gan (IL); Itzhak Pomerantz, Kefar Sava (IL); Elie Meimoun, Jerusalem (IL)

(72) Inventors: Guy Davidi, Ramat Gan (IL); Ofer Davidi, Ramat Gan (IL); Itzhak Pomerantz, Kefar Sava (IL); Elie Meimoun, Jerusalem (IL)

( * ) Notice: Subject to any disclaimer, the term of this patent is extended or adjusted under 35 U.S.C. 154(b) by 0 days.

(21) Appl. No.: 16/081,434

(22) PCT Filed: Mar. 3, 2017

(86) PCT No.: PCT/IB2017/051249
§ 371 (c)(1),
(2) Date: Aug. 31, 2018

(87) PCT Pub. No.: WO2017/149505
PCT Pub. Date: Sep. 8, 2017

(65) Prior Publication Data
US 2019/0056584 A1    Feb. 21, 2019

Related U.S. Application Data

(60) Provisional application No. 62/302,839, filed on Mar. 3, 2016.

(51) Int. Cl.
| G02B 25/02 | (2006.01) |
| G02B 13/16 | (2006.01) |
| G02B 27/14 | (2006.01) |
| G01N 21/87 | (2006.01) |
| G02B 25/00 | (2006.01) |
| H04N 5/225 | (2006.01) |
| G02B 27/10 | (2006.01) |
| G02B 27/12 | (2006.01) |
| G01N 21/88 | (2006.01) |

(52) U.S. Cl.
CPC ........... *G02B 25/007* (2013.01); *G01N 21/87* (2013.01); *G02B 13/16* (2013.01); *G02B 25/008* (2013.01); *G02B 25/02* (2013.01); *G02B 27/14* (2013.01); *H04N 5/2254* (2013.01); *G01N 21/8803* (2013.01); *G02B 27/106* (2013.01); *G02B 27/126* (2013.01)

(58) Field of Classification Search
CPC ...... G02B 25/007; G02B 13/16; G02B 25/02; G02B 27/14; G02B 25/004; G02B 25/005; G01N 21/87; H04N 5/2254
See application file for complete search history.

(56) References Cited

U.S. PATENT DOCUMENTS

| 5,078,469 A * | 1/1992 | Clark | A61B 3/132 |
| | | | 351/158 |
| 2003/0044058 A1* | 3/2003 | Tada | G01N 21/956 |
| | | | 382/145 |
| 2016/0054560 A1* | 2/2016 | Alkouby | G02B 25/007 |
| | | | 348/79 |
| 2016/0131867 A1* | 5/2016 | Greene | G02B 7/28 |
| | | | 250/348 |

* cited by examiner

*Primary Examiner* — Thai Q Tran
*Assistant Examiner* — Jose M Mesa
(74) *Attorney, Agent, or Firm* — The Law Office of Joseph L. Felber

(57) ABSTRACT

Disclosed herein is a sensor loupe where the user can look at a gemstone through a passive optical loupe and take a picture of the exact field of view that he sees.

10 Claims, 11 Drawing Sheets

LOUPE CAMERA

BACKGROUND

The following terms are defined for use in the present disclosure:

Loupe—A magnifying optical device used for, among others purposes, to look at gemstones as shown in https://en.wikipedia.org/wiki/Loupe.

Midbody—An optional central part of the optical structure of a loupe, not including the front and rear lenses, as shown in FIG. 1.

Optical axis (of an optical device)—a line along the axis of the front lens of the optical device Orthogonal reflection—a reflection of a beam of light by a reflector, in which the outcoming beam is perpendicular to the incoming beam.

Loupes have been used by jewelers for inspection of diamonds and precious stones for many years.

The communication about and businesses relating to diamonds benefit a lot from the ability to take accurate and reliable photographs of the stones and to send them between professionals.

The small size of the objects in this industry and the limited resolution of digital cameras require optical magnification of the objects before taking their photo.

Dedicated devices for taking high quality photographs of diamonds and gems are available as metallurgical microscopes and are known in the industry.

Cameras configured to take magnified photos of diamonds are available in the market as "gemstone microscopes," such as KSW 4000 by Krauss (http://www.kruess-.com/gemmology/products/gemstone-microscopes/).

However, professionals want small and portable devices that can be easily carried like their legacy loupe.

Moreover, they would prefer to use their smartphone as part of the system, utilizing its screen, storage and communication capabilities to save space and cost.

Solutions that optically interface between the gemstone and the smartphone—enabling the user to use the smartphone camera—are of the type that can be attached to the phone camera—such as the 60× Magnification Mini Microscope For iPhone 4 (UV+LED Lights)—available from SW-BOX in http://www.sw-box.com/. However, such products do not enable to jeweler to view the gemstone through his traditional loupe and force him to work through the screen of the camera, which is not natural for him. These solutions also require that the user hold the phone in his hand, which causes instability in adjustment of the phone.

A solution that enables resting the smartphone on the desk while taking a photograph of the stone is available from Triple-d at Ramat Gan, Israel. This solution shows the diamond to the jeweler through the camera and the telephone screen, unlike his habit to view them through an optical loupe without digital mediation.

Unfortunately, there is no product available that combines the traditional, purely optical view of the loupe with a digital camera that can capture the view seen by the jeweler and creates a digital image that can be instantly communicated to others.

SUMMARY

The present invention is a loupe camera that creates photographic images which are identical to the image seen by the jeweler through an optical loupe.

The invention combines an optical loupe with a digital camera in a design that offers the following unique combination of features:

1. A user sees a stone through an optical loupe.
2. A sensor sees the stone from the same direction as that of the user.
3. When the user sees the stone in focus, the sensor too sees the stone in focus.
4. The device can be adjusted to any eye.
5. The stone can be sequentially illuminated from many directions to create overlapping images with different illuminations.

The invention will be clearly understood using the illustrations and explanations provided herein below.

BRIEF DESCRIPTION OF THE DRAWINGS

Embodiments of the invention is described below in the appended claims, which are read in view of the accompanying description including the following drawings.

DETAILED DESCRIPTION OF THE DRAWINGS

The invention summarized above and defined by the claims below will be better understood by referring to the present detailed description. This description is not intended to limit the scope of claims but instead to provide examples of the invention.

Figure 1:
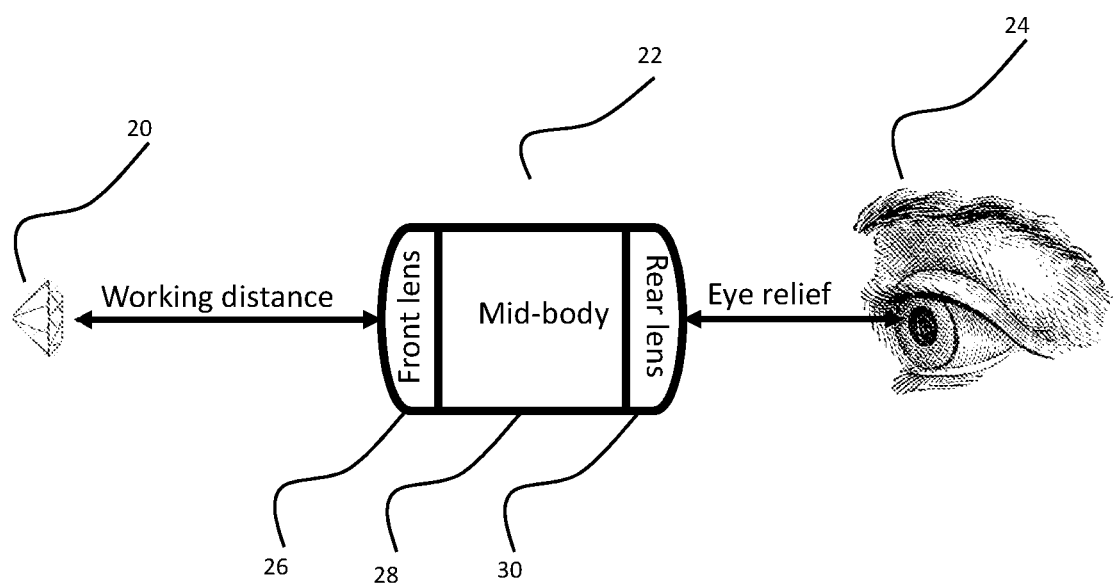
FIG. 1 shows a standard loupe with three optical parts.

Attention is now called to FIG. 1. FIG. 1 describes a prior art loupe made of three optical elements (triplet). There are also loupes made of two elements (doublets).

A stone 20 is positioned in front of a loupe 22 generally comprising three general optical parts—a front lens 26, a mid-body 28 and a rear lens 30. A user 24 can see a magnified image of the stone by looking through the loupe. The interfaces between the front lens 26 and the mid-body and between mid-body 28 and rear lens 30 are usually spherical surfaces.

Figure 2:
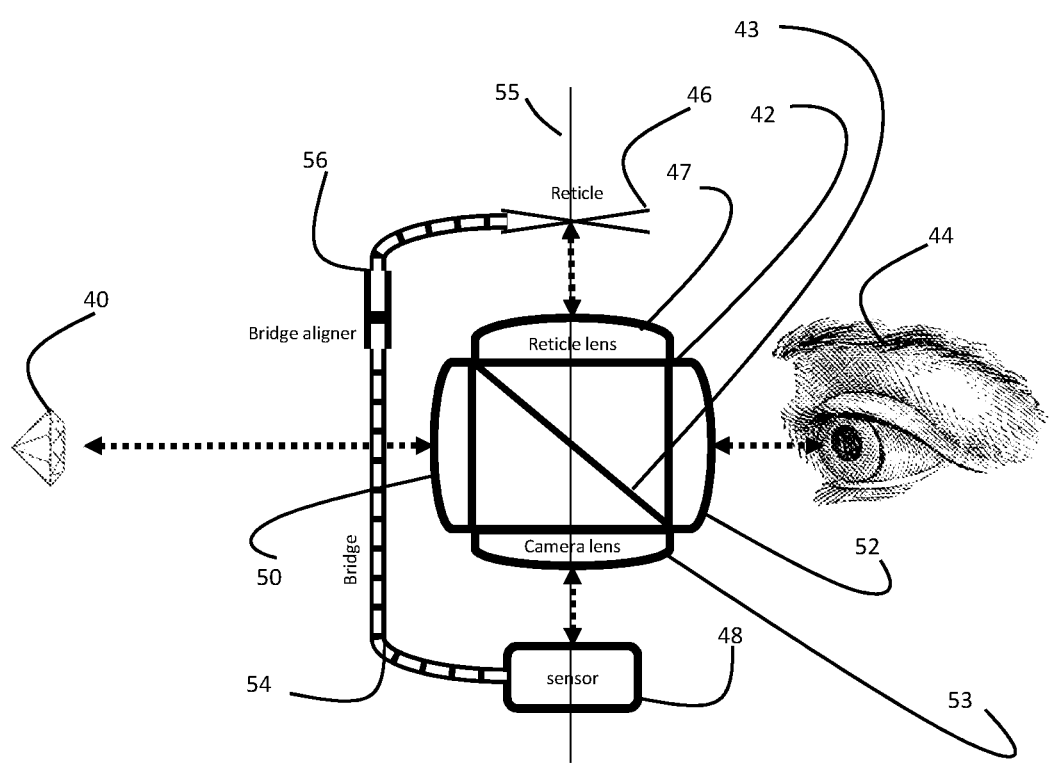
FIG. 2 shows an optical configuration of an embodiment of the present invention.

Attention is now called to FIG. 2, which is a schematic representation of an embodiment of the invention.

This figure shows a modified construction of the loupe shown in FIG. 1. A beam splitting surface 43 is positioned at 45 degrees in the mid-body.

The manufacture of beam-splitting surfaces is very well known in the art. Examples of cube beam splitters can be found, for example, at http://www.edmundoptics.com/optics/beamsplitters/cube-beamsplitters/. The beam splitter surface transmits a part and reflects another part of the incident light reaching it. A digital sensor (such as 1/1.8" Sony IMX178 rolling shutter CMOS sensor from the STAR-VIS series, with a resolution of 6.4 MP—3088×2076 pixels)

is positioned under the mid-body, looking upwards to the beam splitter through a sensor lens 53

A cross-hair reticle is positioned above the mid-body facing down looking at the beam splitter through a reticle lens 47.

The distances between the reticle and the midbody, and between the sensor and the midbody, are adjusted. One exemplary way of adjusting this distance is as follows:

The sensor distance to the mid-body is adjusted so that a stone in a given position in front of the loupe will be in focus on the sensor. This can be verified by looking at the image of the reticle as captured by the sensor on a screen of a mobile phone.

The reticle distance to the midbody is adjusted so that the reticle will be in focus on the sensor.

The distance between the sensor and the reticle is adjusted during production of the device and is mechanically stabilized using a mechanical bridge 54 connecting the sensor and the reticle.

The length of the bridge is adjusted during production, and there is a mechanical control that can move them together along the vertical axis 55.

Light coming from the stone 40 will be propagated to the eye 44 and reflected to the sensor 48.

Light coming from the reticle 46 will be propagated to the sensor 48 and reflected to the eye 44.

Lens 47 or part of it may be connected to the bridge 54 and moves with it to maintain a constant distance between said lens 47 or part of it and the reticle 46.

Lens 53 or part of it may be connected to the bridge 54 and moves with it to maintain a constant distance between said lens 53 or part of it and sensor 48.

Figure 3:
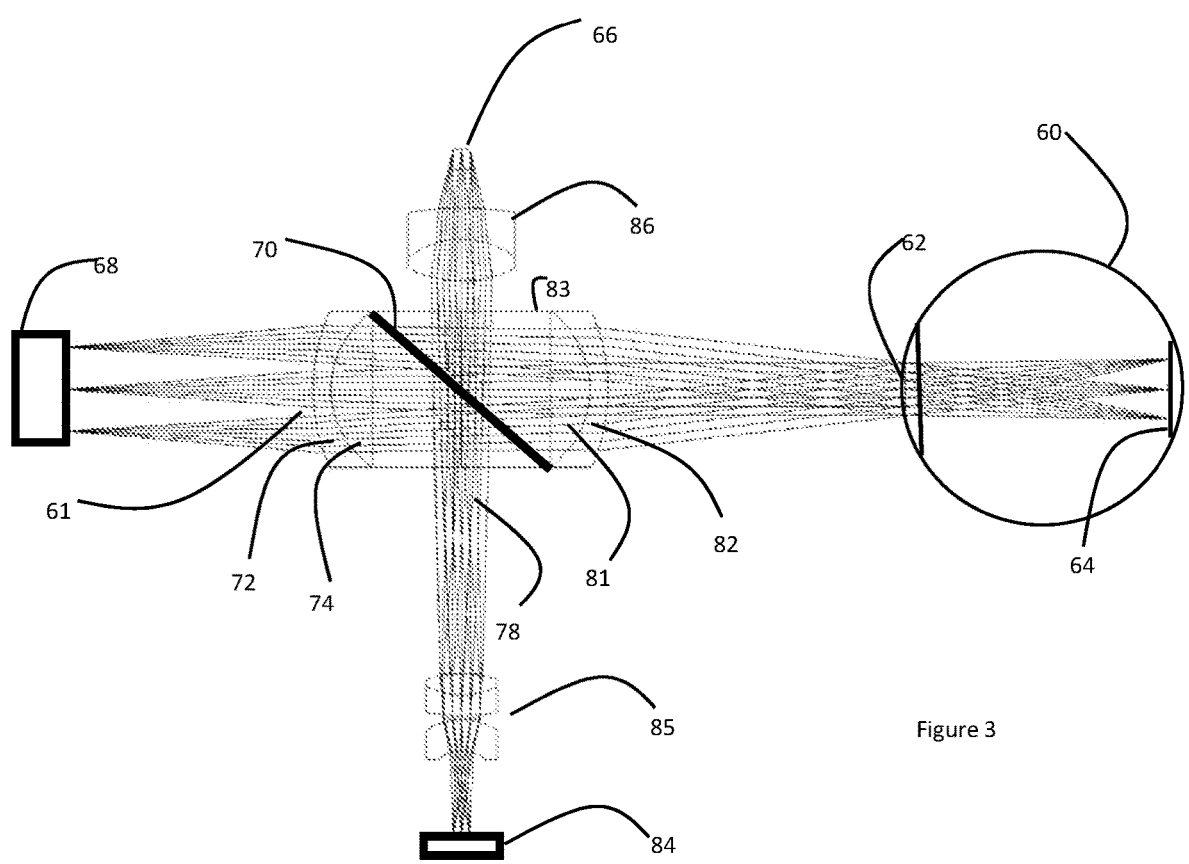
FIG. 3 shows optical paths of the system.

Attention is now called to FIG. 3.

The optical system of the invention is presented schematically. The eye 60 with its retina 64 and lens 62 is looking into the loupe 61. A reticle 66 is positioned above the loupe facing down. A sensor 84 is positioned below the loupe facing up. Mid-body 83 is positioned in the middle of the loupe, and a diagonal beam splitter 70 crosses it in the illustrated direction. An object 68 such as a gemstone or a diamond is held in front of the loupe.

The front lens is made of two sub-elements 72 and 74. Each of the sub-elements is made of a different material. Sub-element 74 can be made of the same material as mid-body 83. Sub-element 74 is preferably attached to (glued) or be the same part as mid-body 83.

The rear lens is made of two sub-elements 81 and 82. Each of the sub-elements is made of a different material. Sub-element 81 can be made of the same material as mid-body 83. Sub-element 81 is preferably attached to (glued) or be the same part as mid-body 83.

In the case that sub-elements 74 and 81 are made of the same material as mid-body 83, the optical path from the object to the eye goes through three materials, which acts as a triplet. If, additionally, sub-elements 72 and 74 are the same as sub-elements 82 and 81 (same materials, same radii of curvature, same thicknesses), one can get an optical design very close to the standard loupes used by jewelers. Such optical design therefore makes the jeweler feel as comfortable as if he were using his standard day-to-day tools.

Object 68 has to be placed so that it is in focus with retina 64. The distance between the object 68 and the loupe 61 mainly depends on the correction of the jeweler's eye 60, while it very slightly depends on the distance between the loupe and the eye.

Reticle lens 86 is designed such that reticle 66 is in focus with retina 64. Since the eye may be not corrected, the position of reticle 66 has to be adjusted. Reticle lens 86 can be made of one or more elements. In FIG. 3 it is made of two elements.

Sensor lens 85 is designed such that reticle 66 is in focus with sensor 84. Since the position of reticle 66 is not fixed, the position of the sensor has to be adjusted accordingly. Sensor lens 85 can be made of one or more elements. In FIG. 3, it is made of three elements.

Figure 4:
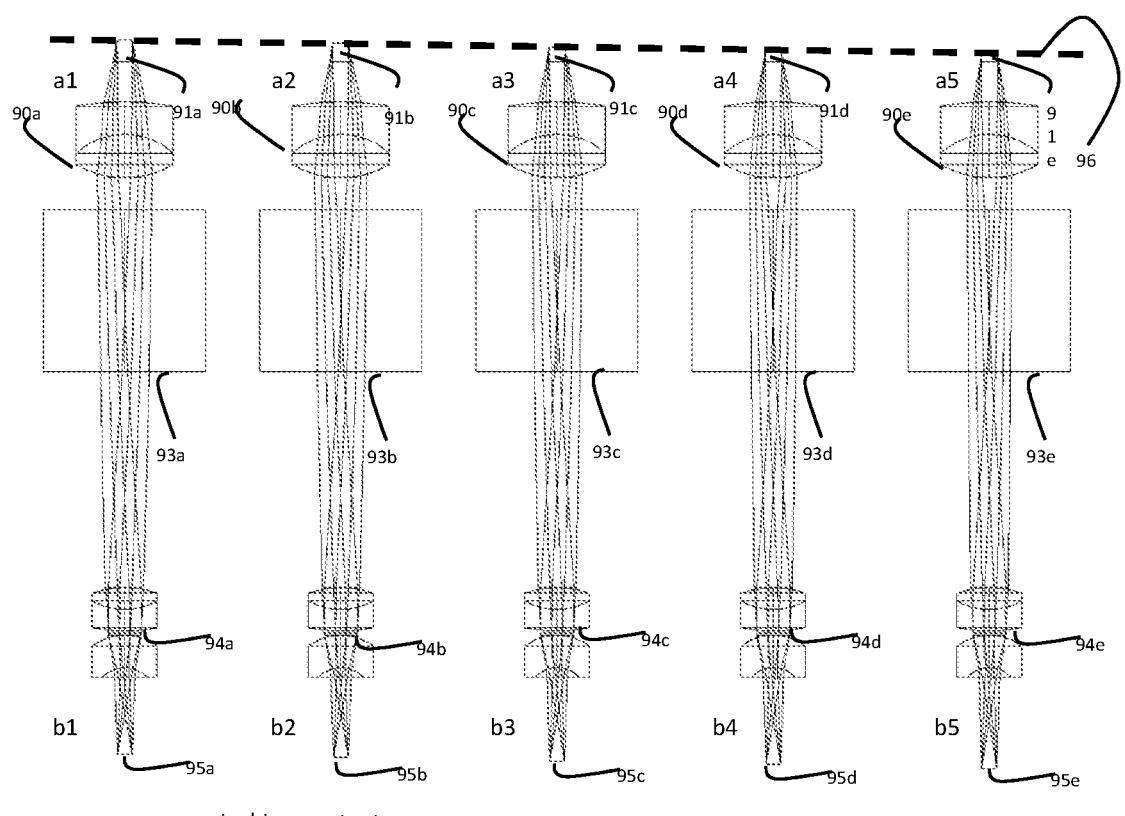
FIG. 4 shows the optical path between the sensor and the reticle.

Attention is now called to FIG. 4

FIG. 4 shows the optical path between the reticle (91a, 91b, 91c, 91d, 91e) and the sensor (95a, 95b, 95c, 95d, 95e) at five different positions of the reticle, as shown by slanted line 96. As explained earlier, the reticle moves back and forth in order to be in focus with the retina. On the other hand, the sensor has to remain in focus with the reticle. Reticle lens and sensor lens are therefore configured to keep the reticle and the sensor in focus while they move together along a vertical axis. Reticle lens (90a, 90b, 90c, 90d, 90e) and sensor lens (94a, 94b, 94c, 94d, 94e) do not move relative to the loupe body (93a, 93b, 93c, 93d, 93e). Only the reticle and the sensor do.

The distance between the reticle and the sensor is adjusted to be in focus during the loupe manufacturing.

Figure 5:
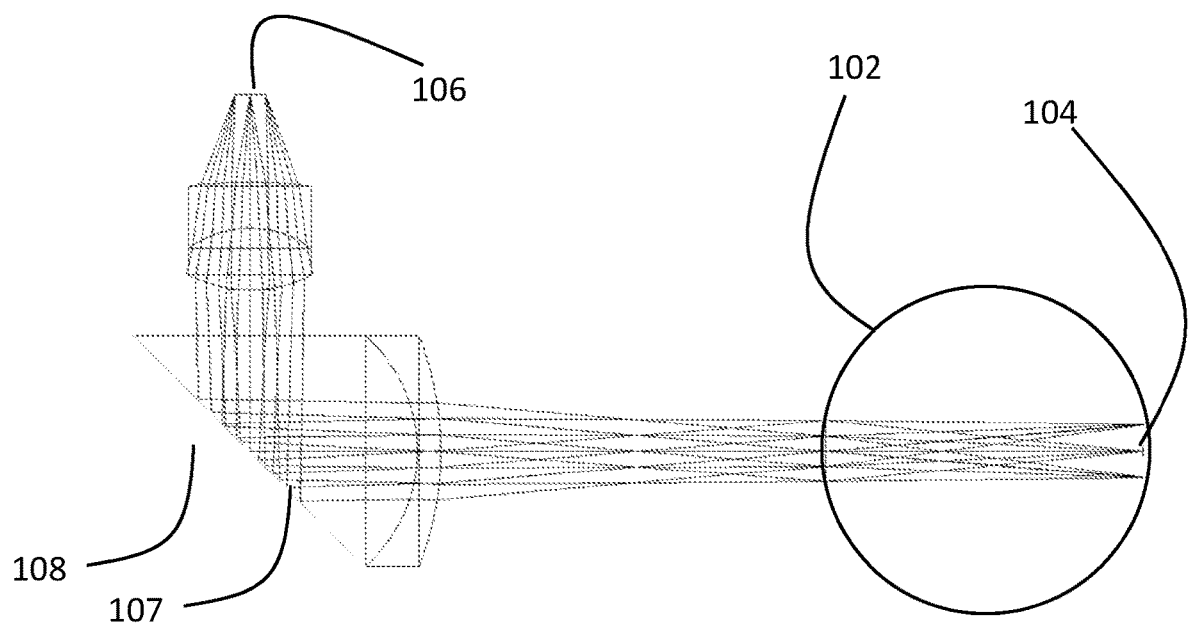
FIG. 5 shows the optical path between the user's eye and the reticle.

Attention is now called to FIG. 5

In this illustration, all the optical components are the same as in FIG. 3. The figure shows the optical path of the eye calibration step, where the user is adjusting the position of the reticle-sensor structure 108 to set the optical distance between the eye 102 and the reticle 106 so that the reticle 106 is focused on the user's retina 104. The beam is reflected by the diagonal beam splitter 107.

Figure 6:
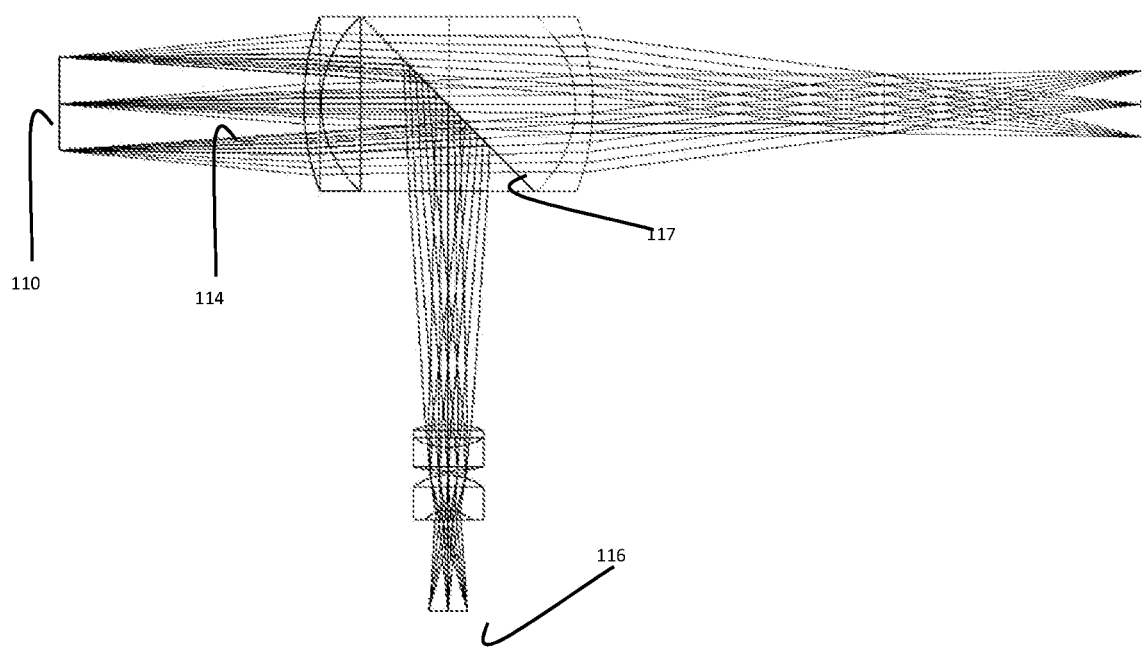
FIG. 6 shows the optical path between the sensor and the stone.

Attention is now called to FIG. 6

In this illustration, all the optical components are the same as in FIG. 3. The figure shows the optical path of the photographing step, where the object in in focus simultaneously with the eye and the sensor. Sensor 116 is triggered by a button (not shown) to take a snapshot of object 110, and optical path 114 of the light from the object to the sensor is reflected by beam splitter 117.

As can be understood from previous figures, the procedure can, in one embodiment, be as follows:

a) During the loupe manufacturing, the distance between the reticle and the sensor is adjusted and locked so that they are in focus b) The jeweler looks at the reticle and adjusts the reticle position so that it is seen in focus. Since the sensor moves with the reticle, the reticle is in focus with both the eye and the sensor.

c) The jeweler places the stone under test so that he sees it in focus. The stone is now in focus with both the eye and the sensor.

Figure 7:
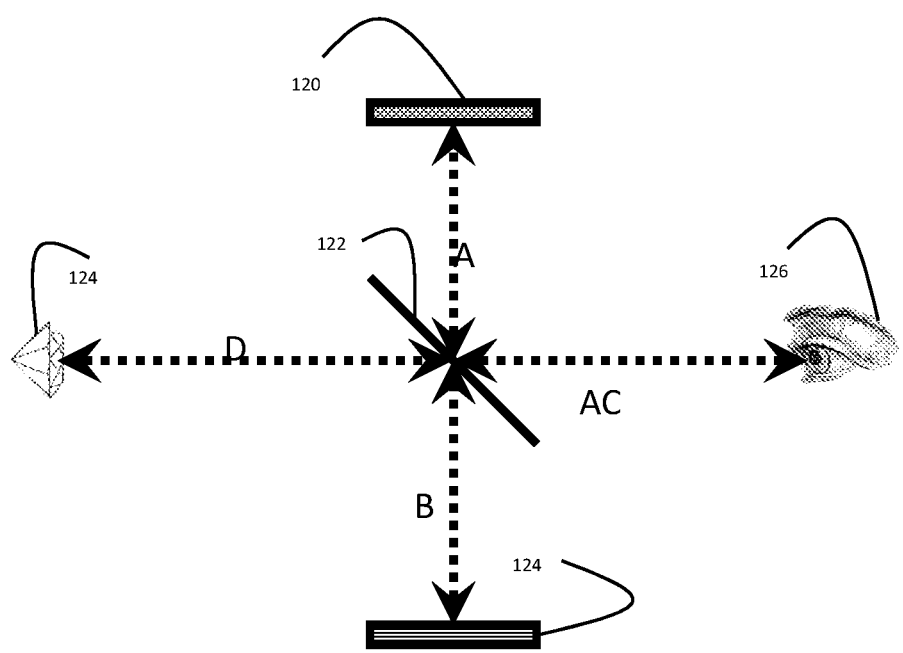
FIG. 7 shows the optical path between the user's eye and the stone.

Attention is now called to FIG. 7—

The optical components in this figure are the same as in FIG. 3. This figure shows the optical path between the eye and the object when the loupe is used as a regular loupe.

We call the distances between the four items and the center of the beam splitter as follows:

A—Distance to the reticle
B—Distance to the sensor
C—Distance to the retina of the eye
D—Distance to the object.

We call the focal distance of the sensor K and the focal distance of the eye—E.

We have—

$A+B=K$ (adjusted on production)

$A+C=E$ (adjusted to by the user to his eye)

$D+C=E$ (the user places the object in focus of his eye)

Then the sensor sees the object at a distance of D+B, and we can see that $D+B=E-C+K-A=A+K-C=K$ And therefore the object is in focus for the sensor.

In another preferred embodiment, the calibration of focus can be done by adjusting the position of the reticle and the sensor to get a focused image of the reticle on a screen, typically a smartphone screen, and adjusting the distance of the reticle from the eye to get a focused image of the reticle on the user's retina. This two-step process ensures that whatever is focused on the user's eye, is also focused on the sensor.

Figure 8A:
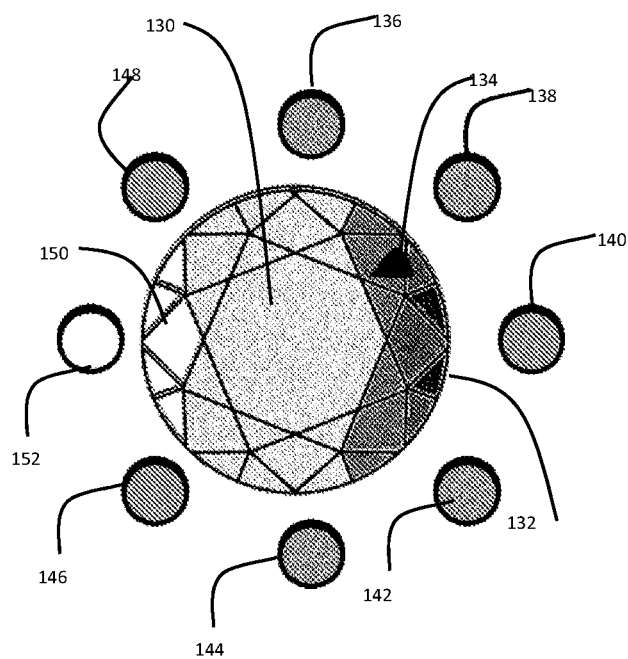
FIGS. 8A and 8B show two cases of illumination.
Figure 8B:
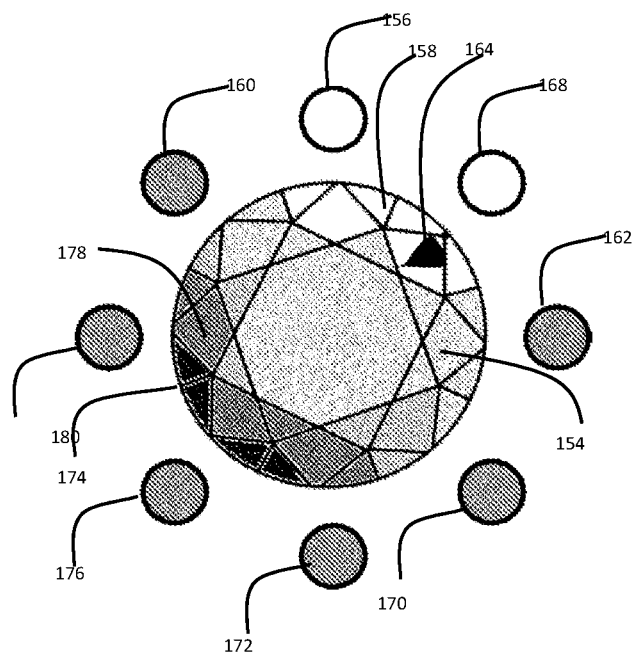

Attention is now called to FIGS. 8A and 8B

In FIG. 8A, eight white light emitting diodes (leds) 136, 148, 152, 146, 144, 142, 140 and 138 are arranged in a circle around the object in front of the sensor. Each of them illuminates the stone from a different direction. In this figure led 152 is on, and the stone is illuminated so that facet 150 and its neighborhood are shining, while facet 132 and its neighbors are shadowed. Facet 130 and its neighbors are partially illuminated. An artifact in the stone, 134, is well poorly illuminated and is hardly seen by the loupe sensor.

In FIG. 8bA, eight white leds 156, 160, 180, 176, 172, 170, 162 and 168 are arranged in a circle around the object in front of the sensor. Each of them illuminates the stone from a different direction. In this figure leds 168 and 156 are on, and the stone is illuminated so that facet 158 and its neighborhood are shining, while facet 178 and its neighbors are shadowed. Facets 154 and its neighbors are partially illuminated. An artifact in the stone, 164, is well illuminated and seen by the loupe sensor.

The illumination configuration illustrated in this figure can be programmed to provide several types of illumination photographing, by way of example:

All leds are on—maximum Omni directional illumination

One led is on—minimum, unidirectional illumination

Sequencing the leds so that the stone is illuminated from one direction after the other, and presenting the sequence of 8 images in a loop, so that the shadows and bright spots are changing while the physical artifacts are stable.

Synthesizing, by software, a collage image in which each part of the stone is taken from the snapshot that presents it optimally, and using the synthetic image as a map of the stone.

Figure 9:
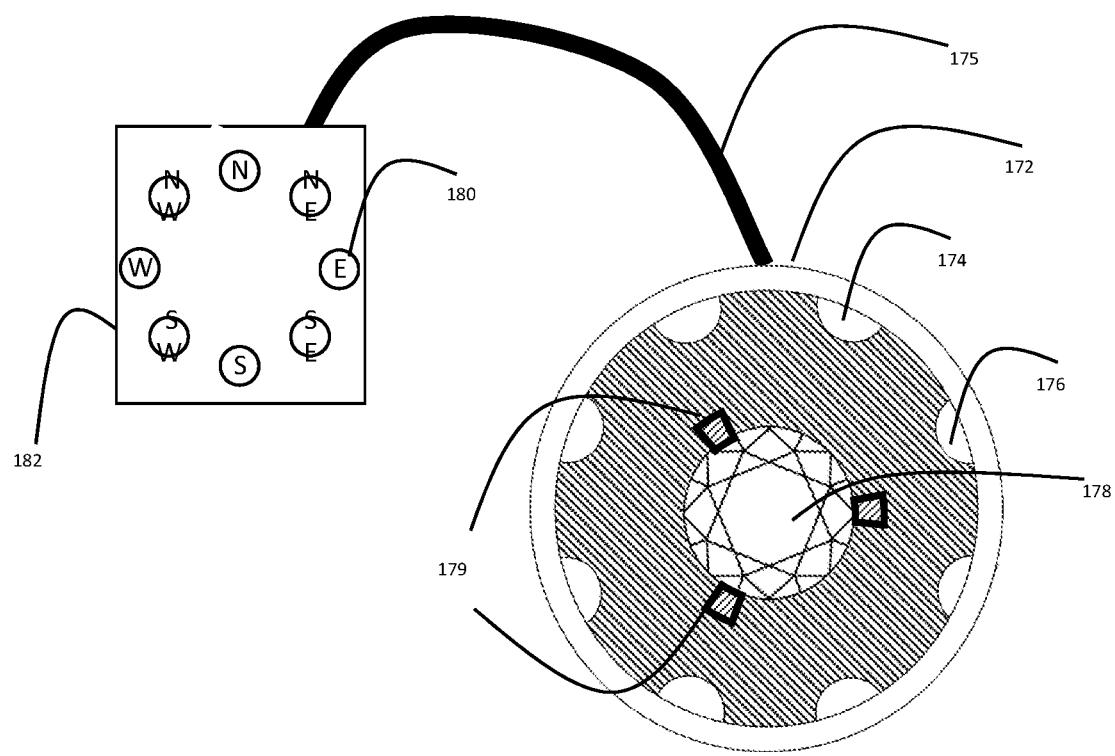
FIG. 9 shows an illumination cup.

Attention is now called to FIG. 9

This illustration shows the cup 172 with the 8 leds 176, 174 etc. arranged on its inside wall. The object, such as gemstone, is fixed to the floor of the cap using clip 179 or glue or other means of temporary fixing.

The floor of the cup can be sealed or open to allow external light to come in behind the stone.

The inside walls of the cup can be coated with light absorbing material such as black velvet to avoid reflection of light.

The cup is connected to a controller 182 by a cable 175. The controller can have individual switches 180 to control each led, and can also have programmable modes for turning the leds on and off.

The cup can be attached to the loupe by friction and can be used optionally—the alternative being holding the gemstone by hand in front of the loupe.

Figure 10:
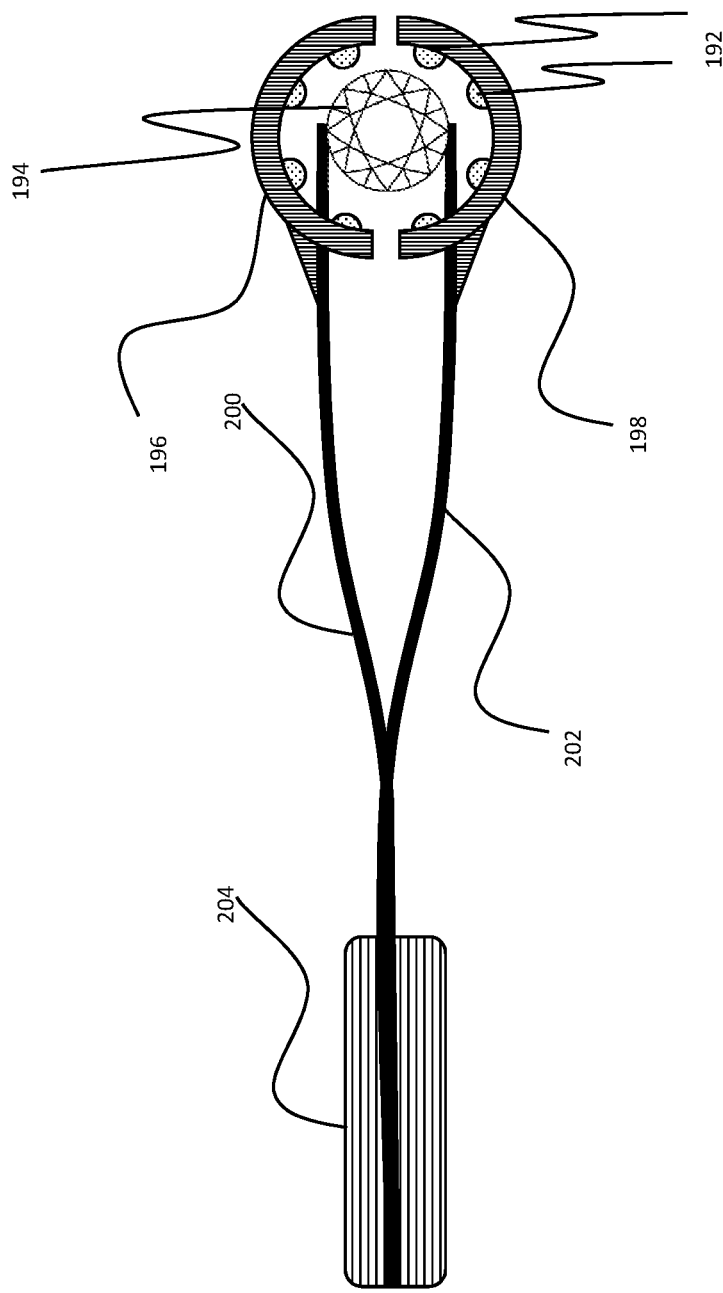
FIG. 10 shows an illuminating diamond tweezers.

Attention is now called to FIG. 10 showing a preferred embodiment of the packaging of the sensor loupe.

The package 194 has a general shape of a cross of four tubes.

The sensor 196 and its lenses 212 and 216 are one arm of the cross.

The reticle 200 and its lenses 204 and 200 are another arm of the cross.

The eyepiece and its lenses 208 and 192 are another arm of the cross.

The front end facing the gemstone 198 and its lenses 214 and 218 are another arm of the cross.

The midbody 220 is the center of the cross, and is being diagonally crossed by the beam splitter 210.

The user can hold the device I one hand and hold the gemstone in another hand, and trigger the sensor by touching a small button (not shown) with his finger.

The system can be powered by its own batteries or be connected with a cable to a power source.

The sensor can be configured to send its images to a processor and display unit, such as the smartphone of the user that can serve as storage, display, editing device and communication device for the sensor in a way well known in the art of digital photography, where images from a sensor are fed to a local computer or phone via a cable, a storage card or radio communication.

Attention is now called to FIG. 10 showing another preferred embodiment of the illumination function of the present invention.

A number of light sources 192 such as a white light emitting diodes are arranged along the internal side of a half ring 198 mechanically fixed to one arm 202 of a tweezers 190 and electrically connected to a controller 204 comprising a battery ore a power supply, installed on the handle 205 of the tweezers.

Other light sources are arranged along the internal side of another half ring 196 mechanically fixed to the other arm 200 of the tweezers 190 and electrically connected to the controller 204.

When the tweezers are engaged with a diamond 194 (that is not a part of this invention), the two half rings 196 and 198 are coming close to the shape of a ring.

The controller 204 is configured in communication with the camera loupe of this embodiment of the present invention, and turns the light sources on and off by command of the loupe camera controller. The controller is configured to synchronize between the illumination and the triggering of the camera so that a series of photos can be taken where each photo gets a different illumination—as described in FIGS. 8 and 9 above. The power supply and the control channel can each be wired to the camera or wireless.

In a preferred embodiment of the present invention, the optical components that are part of the sensor system, namely the sensor, the reticle, and the motion mechanism are configured to be a plug-in unit that can be removed from the loupe when not needed.

The user can use either an ordinary tweezers or an illuminating tweezers.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

Figure 11A:
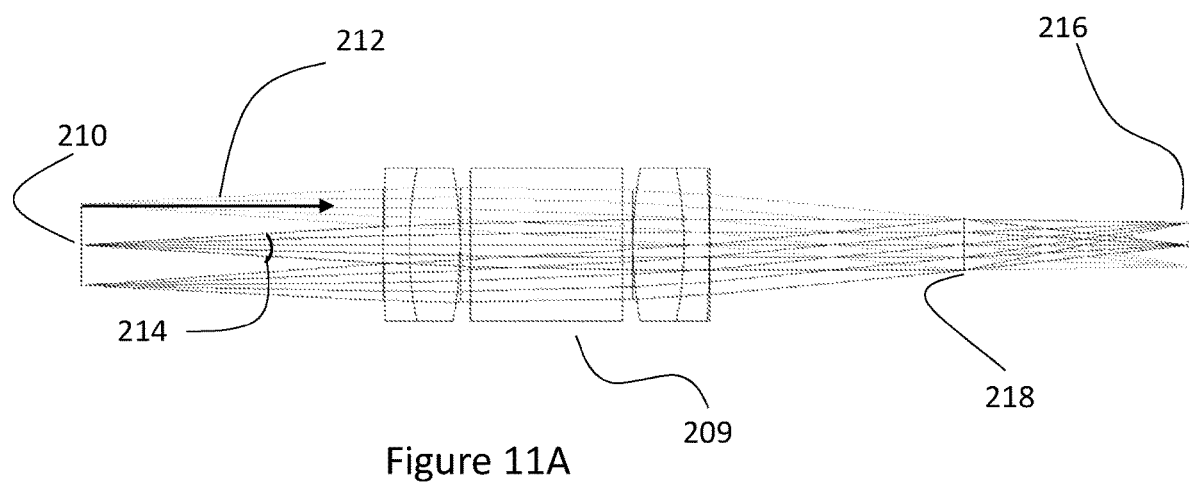
FIGS. 11A and 11B show a preferred optical path.
Figure 11B:
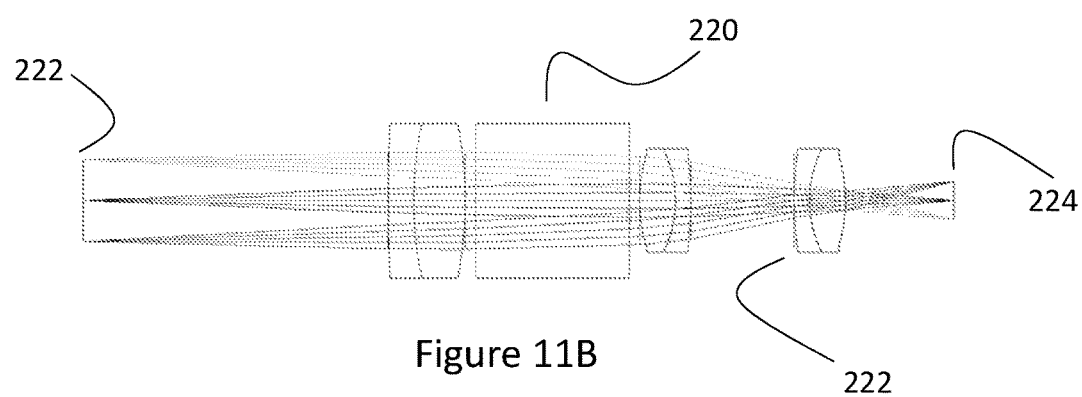

Attention is now called to FIGS. 11A and 11B showing a deployed layout of a preferred optical path from the stone to the eye and from the stone to the sensor.

FIG. 11A shows a deployed optical path from the stone 210 to the retina of the user's eye 216 through a set of lenses 209 and through the eye lens 218.

FIG. 11B shows a deployed optical path from the stone 222 to the sensor 224 through a set of lenses 220 and 222.

The two sets of lenses 209 and 220 are configured to create images of the stone on the eye's retina and on the sensor with essentially identical angular properties, namely the same direction and the same angular aperture. This identity will cause the eye and the sensor to get the same reflection of the external light illuminating the stone. This will cause the same surfaces of the stone to shine for the eye and for the sensor—thus capturing in the sensor not only the contours of the stone surfaces as the eye sees them, but also the shining of the surfaces as the eye sees them.

We claim:

1. A method of using a loupe camera with adjusted distances between a sensor and a reticle and between a beam splitter and a reticle, the method comprising the steps of
   a. illuminating a gemstone sequentially from multiple directions and taking a snapshot from each direction;
   b. dividing the image of the gemstone into sub-areas;
   c. composing a synthetic image of the gemstone, where each sub-area is taken from the image where a cost function graphically calculated on the sub-area is maximal; and
   d. displaying the synthetic image;
   wherein the loupe camera includes artificial illumination.

2. The method as in claim 1, wherein the sub-areas are selected to have one of maximum and minimum brightness.

3. A loupe camera comprising: a. a loupe having a midbody and lenses, the loupe midbody being at least as long as the effective diameter of the largest of the loupe lenses; and b. an electro-optical sensor; wherein in use by a user of the loupe camera viewing a stone:
   i. first optical paths extend from each point of the stone, through the midbody, and to an eye of the user; and
   ii. second optical paths extend from the stone, through the midbody, and to the sensor; and wherein the lenses are configured so that the portions of both the first and second optical paths between the stone and the midbody have the same directions and the same angular apertures.

4. A loupe camera comprising:
   a. a loupe having a midbody, a diagonal beam splitter in the midbody, a front lens, and a rear lens; and
   b. an optical sensor; and
   c. a reticle that is not on the optical axis of the front lens; wherein each point of an object imaged through the front lens and the midbody onto both said optical sensor and an eye of a user is imaged in the same direction to the front lens and having the same aperture angle; and wherein the midbody is at least as long as the diameter of the largest of the loupe lenses.

5. The loupe camera of claim 4, wherein the object has shining surfaces and surface contours, and thus the optical sensor captures the shining surfaces and surface contours as the eye sees them.

6. The loupe camera of claim 5, wherein said object is a gemstone.

7. The loupe camera of claim 4, wherein the reticle is used to adjust the position of the optical sensor such that the object is focused onto both the optical sensor and the eye.

8. The loupe camera of claim 4, wherein the beam splitter is angled at 45 degrees to the optical axis of the front lens.

9. The loupe camera of claim 8, wherein the midbody, the front lens and the rear lens are manufactured in one single block.

10. The loupe camera of claim 7 wherein the beam splitter is angled at 45 degrees to the optical axis of the front lens.

\* \* \* \* \*